United States Patent
Anthony et al.

(10) Patent No.: US 11,845,127 B2
(45) Date of Patent: Dec. 19, 2023

(54) POWDER LAYER FORMER WITH FLOWING GAS SEAL

(71) Applicant: Hewlett-Packard Development Company, L.P., Spring, TX (US)

(72) Inventors: Thomas Anthony, Palo Alto, CA (US); Seongsik Chang, Palo Alto, CA (US); Keith Edward Moore, Palo Alto, CA (US)

(73) Assignee: Hewlett-Packard Development Company, L.P., Spring, TX (US)

(*) Notice: Subject to any disclaimer, the term of this patent is extended or adjusted under 35 U.S.C. 154(b) by 229 days.

(21) Appl. No.: 17/043,112

(22) PCT Filed: Jun. 8, 2018

(86) PCT No.: PCT/US2018/036697
§ 371 (c)(1),
(2) Date: Sep. 29, 2020

(87) PCT Pub. No.: WO2019/236104
PCT Pub. Date: Dec. 12, 2019

(65) Prior Publication Data
US 2021/0060650 A1  Mar. 4, 2021

(51) Int. Cl.
*B22F 10/00* (2021.01)
*B33Y 30/00* (2015.01)
(Continued)

(52) U.S. Cl.
CPC .............. *B22F 10/00* (2021.01); *B22F 10/20* (2021.01); *B22F 12/50* (2021.01); *B22F 12/63* (2021.01);
(Continued)

(58) Field of Classification Search
CPC ...... B65D 83/14; B65D 83/38; B67D 1/0418; F17C 1/00; F17C 13/04
See application file for complete search history.

(56) References Cited

U.S. PATENT DOCUMENTS

| 4,155,330 A | * | 5/1979 | Weitzel .............. G03G 15/0914 |
| | | | 399/240 |
| 5,053,090 A | | 10/1991 | Beaman et al. |
| 8,124,192 B2 | | 2/2012 | Paasche et al. |

(Continued)

FOREIGN PATENT DOCUMENTS

| EP | 2695725 | 2/2014 |
| RU | 1262289 | 10/1986 |

(Continued)

*Primary Examiner* — Xiao S Zhao
*Assistant Examiner* — Nicholas J Chidiac
(74) *Attorney, Agent, or Firm* — SHOOK, HARDY & BACON L.L.P.

(57) ABSTRACT

A system to apply uniform layers of metal powder, the system includes: a conductive roller with a dielectric coating, the conductive roller biased at a first voltage; a powder supply to contain a metal powder biased at a second voltage, the powder supply to provide the metal powder to the conductive roller to form a uniform layer of metal powder on the dielectric coating of the conductive roller; a deposition area to receive the uniform layer of metal powder from the conductive roller, the deposition area biased at a third voltage, wherein the metal powder is transferred across an air gap from the conductive roller to the deposition area by electrostatic attraction of the metal powder.

15 Claims, 5 Drawing Sheets

(51) Int. Cl.
- *B22F 12/50* (2021.01)
- *B22F 12/63* (2021.01)
- *B22F 10/20* (2021.01)
- *B22F 10/10* (2021.01)
- *B22F 10/37* (2021.01)
- *B33Y 70/00* (2020.01)

(52) U.S. Cl.
CPC ............... *B33Y 30/00* (2014.12); *B33Y 70/00* (2014.12); *B22F 10/10* (2021.01); *B22F 10/37* (2021.01); *B22F 2202/06* (2013.01)

(56) References Cited

U.S. PATENT DOCUMENTS

| | | | |
|---|---|---|---|
| 10,272,664 B2 * | 4/2019 | Hays | G03G 15/1625 |
| 2013/0223891 A1 * | 8/2013 | Koyanagi | G03G 15/0812 |
| | | | 399/284 |
| 2014/0087295 A1 * | 3/2014 | Gila | B41J 2/0057 |
| | | | 399/237 |
| 2014/0363585 A1 | 12/2014 | Pialot et al. | |
| 2014/0368804 A1 * | 12/2014 | Lafarre | B05D 5/00 |
| | | | 355/72 |
| 2015/0029485 A1 * | 1/2015 | Lafarre | B22F 10/00 |
| | | | 355/72 |
| 2015/0309436 A1 * | 10/2015 | Gila | G03G 15/025 |
| | | | 399/115 |
| 2016/0200084 A1 * | 7/2016 | Hays | B33Y 10/00 |
| | | | 156/62.2 |
| 2016/0243764 A1 * | 8/2016 | Hays | B29C 64/153 |
| 2016/0368055 A1 | 12/2016 | Swaminathan et al. | |
| 2016/0368056 A1 | 12/2016 | Swaminathan et al. | |
| 2017/0157849 A1 | 6/2017 | Mook et al. | |
| 2017/0203391 A1 | 7/2017 | Budge | |
| 2018/0141126 A1 * | 5/2018 | Buller | B29C 64/153 |

FOREIGN PATENT DOCUMENTS

| | | |
|---|---|---|
| WO | WO-2009108913 | 11/2009 |
| WO | WO-2016176432 | 11/2016 |

* cited by examiner

POWDER LAYER FORMER WITH FLOWING GAS SEAL

BACKGROUND

Three dimensional printing has seen increasing use as a method of manufacturing parts. Historically, metal parts, generally machined and/or cast, were used for components in mechanically demanding applications. Machining tended to be the most expensive due to the cost of a skilled machinist. However, machining was also highly flexible and capable of tight tolerances that were difficult to achieve by other methods. The development of automated and semi-automated machining techniques has reduced the touch time (the time a machinist was operating a system) and the cost of machining parts. Swiss machines (historically) and Computer Numerical Control (CNC) mills have seen increasing adoption as they have been able to automate increasingly complex machining tasks, with a reduction in per part machinist time. However, other technologies have emerged that also have threatened the supremacy of machined metal parts.

Three dimensional printing has been able to produce figures using polymers. These figures often lack mechanical strength due to the polymers used. In some cases, figures have been produced using three dimensional printing and then used to cast metal parts, for example, using a lost wax process. This has sometimes been more cost effective than machining parts but overall the increased number of operations and different technologies (printing and casting) used have slowed adoption of this approach.

Powder metallurgy molding has seen some experimentation but has suffered from a number of technical challenges. Using the principles from powder metallurgy molding, some advancement has been made in the area of three-dimensional printing of metal parts.

BRIEF DESCRIPTION OF THE DRAWINGS

The accompanying drawings illustrate various examples of the principles described herein and are a part of the specification. The illustrated examples do not limit the scope of the claims.

Figure 1:
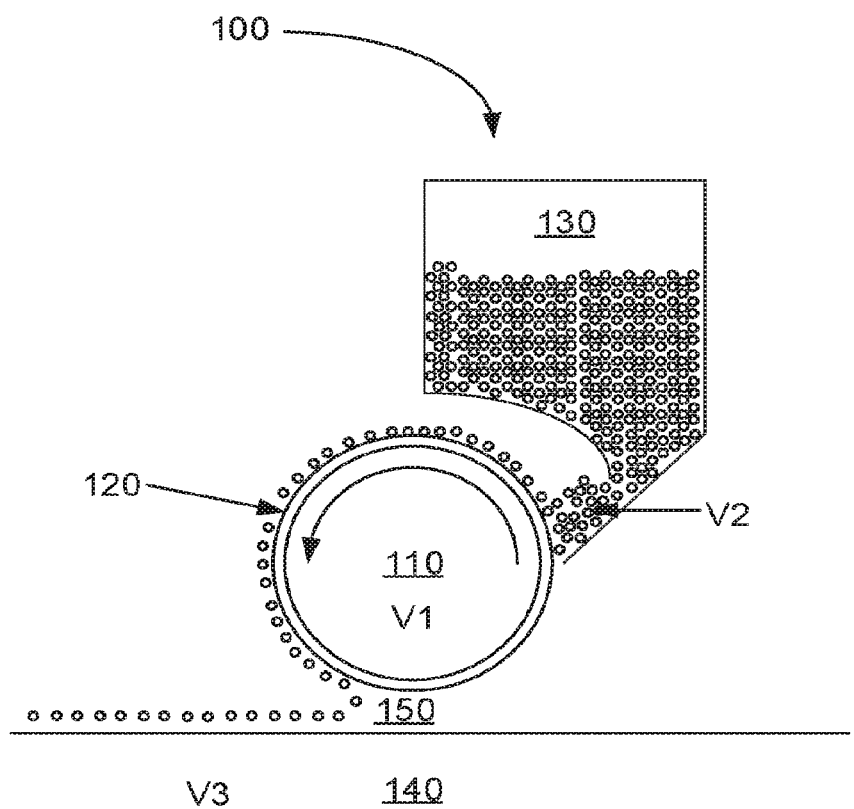
FIG. 1 shows a system to apply uniform layers of metal powder according to one example consistent with the present specification.

Throughout the drawings, identical reference numbers designate similar, but not necessarily identical, elements. The figures are not necessarily to scale, and the size of some parts may be exaggerated or minimized to more clearly illustrate the example shown. The drawings provide examples and/or implementations consistent with the description. However, the description is not limited to the examples and/or implementations shown in the drawings.

DETAILED DESCRIPTION

Metal parts may be formed from layers of metal particles. The metal particles are sintered together to form a consolidated part. The sintered part may be further increased in density by heating to allow additional sintering to fill interstitial space in the part.

Layers of metal particles may be formed using mechanical spreaders, blades, etc. These devices may disrupt layers beneath the new layer being formed. Such disruptions may produce defects in the formed parts. Such disruptions may limit the feature size which may be incorporated into the part. Similarly, the thickness of the layer may limit the size of the feature which may be incorporated into the part in the axis perpendicular to the layers. Simply put, thicker layers may build a part up faster but reduce resolution; thinner layers may take more time but allow forming of finer features.

Among other examples, this specification describes a system to apply uniform layers of metal powder, the system including: a conductive roller with a dielectric coating, the conductive roller biased at a first voltage; a powder supply to contain a metal powder biased at a second voltage, the powder supply to provide the metal powder to the conductive roller to form a uniform layer of metal powder on the dielectric coating of the conductive roller; a deposition area to receive the uniform layer of metal powder from the conductive roller, the deposition area biased at a third voltage, wherein the metal powder is transferred across an air gap from the conductive roller to the deposition area by electrostatic attraction of the metal powder.

This specification also describes a system to apply uniform layers of metal powder, the system including: a conductive roller with a dielectric coating, the conductive roller biased at a first voltage; a powder supply to contain a metal powder biased at a second voltage, the powder supply to provide the metal powder to the conductive roller to form a monolayer of metal powder on the roller; a deposition area to receive the monolayer of metal powder from the conductive roller, the deposition area biased at a third voltage, wherein the metal powder is transferred across an air gap from the roller to the deposition area by electrostatic attraction of the metal powder, a surface of the deposition area and the surface of the roller are separated by an air gap of 0.1 to 5 mm, and a voltage difference between the first voltage and the third voltage is between 100 and 5000 volts.

This specification also describes a method of applying uniform layers of metal powder to a substrate including: biasing a conductive core of a roller to a first voltage; attracting the metal powder from a reservoir at a second voltage to a dielectric surface of the roller to form a uniform layer of charged metal powder particles on the surface of the roller; and transferring the metal powder from the dielectric surface of the roller to a deposition area, wherein the metal powder transfers through an air gap based on electrostatic attraction of the charged metal powder to form a uniform layer on the deposition area, the deposition area having a third voltage.

Turning now to the figures, FIG. 1 shows a system (100) to apply uniform layers of metal powder according to an example consistent with the present specification. The system (100) includes: a conductive roller (110) with a dielectric coating (120), the conductive roller (110) biased at a first voltage (V1); a powder supply (130) to contain a metal powder biased at a second voltage (V2), the powder supply (130) to provide the metal powder to the conductive roller (110) to form a uniform layer of metal powder on the dielectric coating of the conductive roller (110); a deposition area (140) to receive the uniform layer of metal powder from the conductive roller (110), the deposition area (140) biased at a third voltage (V3), wherein the metal powder is transferred across an air gap (150) from the roller (110) to the deposition area (140) by electrostatic attraction of the metal powder.

The system (100) is a system for applying uniform layers of metal particles. The metal particles are provided by the powder supply (130). Electrostatic attraction is used to form a uniform layer of metal particles on the conductive roller (110). The layer is then transferred by electrostatic attraction to the deposition area (140).

The conductive roller (110) is biased at a first voltage (V1). The use of a conductive roller (110) allows forming of a uniform voltage across a surface of the conductive roller (110) as long as the thickness and properties of the dielectric coating (120) are controlled. The first voltage of the conductive roller attracts the metal powder from the powder supply (130).

The first voltage may be positive, negative, or ground. The specific values of the first, second, and third voltages may be adjusted as it is the voltage difference between the first and second voltages which regulates forming the layer on the dielectric coating (120) of the conductive roller and the voltage difference between the first and third voltages which regulates transfer from the conductive roller (110) to the deposition area (140).

The dielectric coating (120) covers the portion of the conductive roller (110) used to form and transfer the layer of metal particles. The dielectric coating (120) may cover other portions of the conductive roller (110). The dielectric coating (120) may include a ceramic and/or mineral. Ceramics and/or minerals provide wear resistance and may have low stiction compared with, for example, a polymer coating. The dielectric coating may be a composite, for example, with a harder material embedded in a binder.

In an example, the dielectric coating (120) includes a material selected from: aluminum oxide, silicon oxide, zirconium oxide, magnesium oxide, tantalum oxide, titanium oxide, yttrium oxide, silicon nitride, silicon carbide, and/or aluminum nitride. The dielectric coating (120) may include a polymer such as a polyurethane, a polycarbonate, an acrylate, a silicone. The dielectric coating may include a hard surface coating such as diamond-like carbon, titanium nitride, etc. This surface coating may be applied over other dielectric materials to reduce wear.

Charge resides on particles in the powder supply (130) that are adjacent to the dielectric coating (120) of the conductive roller (110). Particles that are not adjacent to the dielectric coating (120) of the conductive roller (110) are not charged. Charged particles attracted by electrostatic forces to the surface of the dielectric coating (120) of the conductive roller (110) form a uniform layer. In an example, the uniform layer is a monolayer of particles on the dielectric coating (120) of the conductive roller (110).

The dielectric coating insulates the attracted, charged metal particles from the conductive roller (110). This preserves the charge on the powder particles and prevents them from discharging on the conductive roller (110).

The powder supply (130) contains the powder to be applied to the roller (110) and eventually to the deposition area. The powder supply is biased at the second voltage. The powder supply (130) may contain a shaker, mechanical devices, such as a screw and/or worm gear, etc. to move and/or meter the metal powder.

The powder is a conductive powder capable of being biased by the second voltage in the powder supply (130). The system (100) may be used with a wide variety of conductive metal powders. Mechanical forming of layers of small particles (mean particle size less than 20 micrometers) can be difficult due to the difficulty of spreading small particles into layers by a blade, roller, or other pushing device. Small particles may tend to clump and not spread. Accordingly, the system (100) may be used with a variety of particle sizes, for example up to 260 microns median size and/or larger. The system (100) may be used with particles having a mean size of under 100 microns. The system (100) may be used with particles having a mean size of 50, 20, 10 microns and/or other similar sizes. In an example, the system (100) deposits a layer of smaller particles having a first mean size using the conductive roller (110) and forms a layer of larger particles having a second, larger mean size, using another tool.

The second voltage may be positive, negative, or ground. The difference in voltage between the first and second voltages controls the movement of the charged metal particles. Similarly, the voltage difference between the first voltage and the third voltage controls transfer from the roller (110) to the deposition area (140). The values of the first, second, and third voltages are flexible compared with the voltage differences used to move the charged metal particles. The additional degree of freedom for the voltages over the voltage differences allow one of the voltages to be set to ground. In an example, the deposition area (140) is set to ground.

The deposition area (140) receives the layer of metal powder from the conductive roller (110). The deposition area (140) is separated by a gap (150) from the conductive roller (110). The deposition area (140) is charged to a third voltage such that the force on the particle toward the deposition area (140) overcomes the attractive force on the particle to the conductive roller (110). The particles then move through the gap (150) under electrostatic attraction from the surface of the conductive roller (110) to the deposition area (140).

The deposition area (140) may be a conductive substrate. The deposition area (140) may be a layer of particles which include sufficient conductive particles to allow the surface of the layer of particles to reach the third voltage. The layer of particles may be a layer of particles previously deposited from the conductive roller (110). The deposition area (140) may include a plurality of layers of particles stacked on each other.

The layer of particles may be a layer of particles formed by another tool, such as a pusher, roller, spreader, and/or blade. In an example, the layers are of different thickness and/or different mean particle size. For example, the layer deposited from the conductive roller may be made of smaller metal particles (on average) and the layer formed in another manner may be made of larger metal particles (on average).

In an example, the system (100) moves relative to the deposition area (140). In an example, the conductive roller (110) translates relative to the deposition area (140) such that a tangential speed of the roller and the translation speed are equivalent. In this configuration, the layer on the conductive roller (110) is applied with equal spacing onto the deposition area so that the thickness is the same. The roller (110) may move faster than the translation relative to the deposition area (140) to produce a thicker deposited layer. The roller (110) may be rotated slower than the translation relative to the deposition area (140) to produce a thinner deposited layer.

There is a gap (150) between the dielectric coating (120) of the conductive roller (110) and the deposition area (140). The metal powder particles move across the gap (150) under the influence of electrostatic attraction and gravity. In an example, the gap (150) is an air gap. The gap (150) may be filled with any reasonable insulator. The gap (150) may be filled with an inert gas, e.g., argon. The gap (150) may be a vacuum.

In an example, the gap (150) is between 0.1 and 5 mm in height. The gap (150) may be 0.1 to 3 mm in height. The gap (150) may be 0.2 to 2 mm in height. The gap (150) may be 0.8 to 1.6 mm in height. Height may be the direction orthogonal to a surface of the deposition area (140). Height may also be the direction of motion of particles traversing the gap (150).

There is a voltage difference between the conductive roller (110) at the first voltage and the deposition area (140) at the third voltage. This voltage difference is sufficient to induce motion from the dielectric surface (120) of the conductive roller (110) to the deposition area (140) when the particles come into proximity of the deposition area (140). In an example, the voltage difference between the first voltage and the third voltage is between 100 and 5000 volts. The voltage difference may be between 500 and 1500 volts.

The selection of the voltage difference between the first and third voltages will depend on factors which may include: the gap (150) height, the size of the particle, the charge on the particle, the thickness of the dielectric layer (120), the dielectric constant of the dielectric layer (120), the voltage difference between the first and second voltages, etc. Smaller particles may rely more on electrostatic attraction and less on gravity compared with larger particles. In order to transfer the particle from the conductive roller (110) to the deposition area (140), the attractive force between a particle adhered to the surface of the roller to the roller (110) is less than the attractive force between the particle and the deposition area (140). Here the attractive force between the deposition area (140) and the particle may include gravity due to the relative position of the components of the system (100).

The system (100) may include a pusher to form layers of particles in the deposition area (140). The system (100) may include a blade to form layers of particles in the deposition area (140).

In order to function; the force between the particle and the roller (110) must be sufficient to hold the particle against the roller when not near the deposition area (140). The attraction between the particle and the roller (110) must also be low enough that the combination of gravity and the attraction to the deposition area (140) can displace the particle from the surface of the roller (110) to transit to the deposition area (140). The rotation of the roller is slow; accordingly the centrifugal contributions to the force balance are omitted in the discussion below for simplicity of presentation.

The charge of particles (Q) will be determined by capacitance ($C_1$) formed between roller and reservoir by $Q=C_1(V1-V2)$, where V1 is the voltage of the powder reservoir wall (120) and V2 is the voltage of the roller (110). If conductive powder touches all the way from the reservoir wall (V1) to the dielectric coating, $C_1$ would be just the capacitance of dielectric coating $C_1 = \varepsilon \pi D^2/4t$, where D is particle diameter, t is thickness of dielectric coating, and $\varepsilon$ is dielectric constant of the coating. This is because if the powder is packed completely around the circumference of the roller, the areal charge density is $\sigma = Q/(\pi D^2/4)$.

The attachment force (F1) for the particle to the conductive roller (110) will be QE, where the electric field E is $E=(V1-V2)/t$. Accordingly, $F1=QE=Q(V1-V2)/t=C_1(V1-V2)^2/t=\pi\varepsilon D^2(V1-V2)^2/4t^2$. Near the bottom of the roller, it is desirable that the metal particles do not fall off under gravity alone. So the attachment force should be greater than the gravitational force on the particle. Accordingly, the attachment force is described by this limit, $\pi\varepsilon D^2(V1-V2)^2/4t^2 > mg$, where m is mass and g is the gravitational constant. Mass increases as the cube of the diameter (multiplied by density), while the attachment force increases as the square of diameter. Practically, management and movement of smaller particles may be easier than larger particles.

In the deposition region, there is a gap (150) between the deposition area (140) and the conductive roller (110) with a height of h. The attractive force (F2) of gravity and the deposition area (140) on the charged particle must equal or exceed the attachment force of the particle to the roller (110) in order to detach the particle from the roller (110) and deposit the particle on the deposition area (140). Accordingly, F2 is greater than or equal to F1−mg in order to detach the particle from the roller (110). The voltage of the deposition area (V3) comes into play, as the difference (V2−V3) between the voltage on the roller (V2) and the voltage on the deposition area (V3) drives the attraction to the deposition area (140).

The electrostatic force (F2) between the roller (110) and the deposition area (140) may be modelled by superposition of electric field by voltage boundary conditions of V2 and V3 and electric field by charges themselves and their image charges. Accordingly, $E=(V2-V3)/(h+t/\varepsilon)+4Q/\varepsilon\pi D^2 (t-h)/(t/\varepsilon+h)$, where field by charge boundary conditions were calculated by how many charges are at each boundary ($\sigma 2$ and $\sigma 3$). At the boundary condition, the total downward force is the sum of the electrostatic force and gravitational force. $F2=Q[(V2-V3)/(h+t/E)+4Q/\pi D^2 (t/\varepsilon-h)/(t/\varepsilon+h]+mg$.

Here, $t/\varepsilon$ is defined as dielectric thickness, which is a common terminology in electrostatics, where dielectric thickness instead of absolute thickness is a handy term in many electrostatic calculations. Dielectric thickness in electrostatics is a universal thickness that already factored dielectric behaviour of a material. A reasonable coating thickness range is 0.03 mm to 1.5 mm, and typical dielectric constant range is 3 to 30. Therefore, a reasonable range for the dielectric thickness will be 0.001 mm to 0.5 mm.

Figure 2:
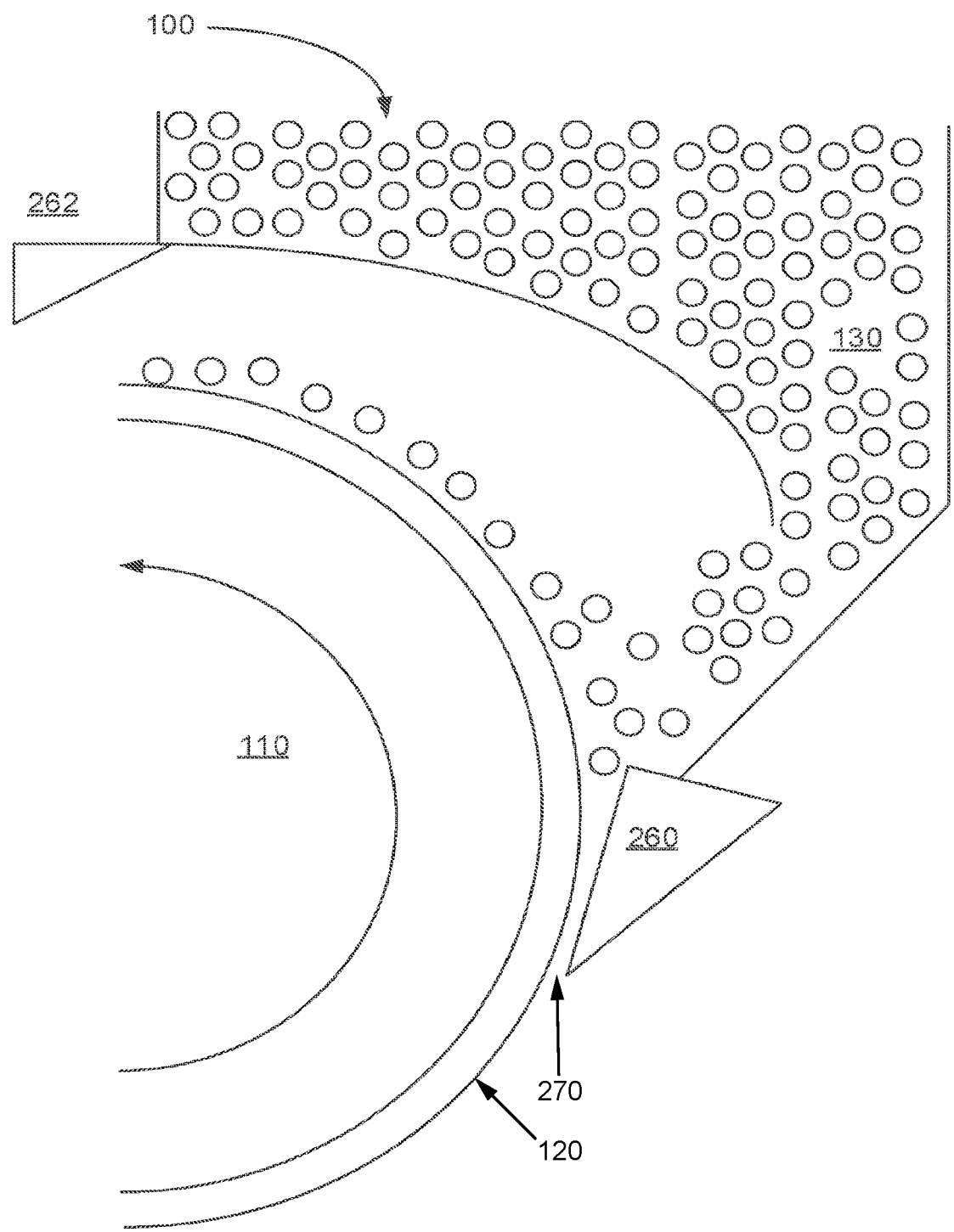
FIG. 2 shows a portion of a system to apply uniform layers of metal powder according to one example consistent with the present specification.

FIG. 2 shows a portion of a system (100) to apply uniform layers of metal powder according to one example consistent with the present specification. FIG. 2 shows the conductive roller (110) rotating counterclockwise with a dielectric coating (120) on the surface of the conductive roller (110). The powder supply (130) contains metal powder particles which are attracted to the conductive roller (110) and form a uniform layer on the dielectric coating. A first seal (260) and/or a second seal (262) are located at the points where the powder supply (130) and the dielectric coating (120) are in proximity to each other.

The first seal (260) may provide support for the metal powder to avoid leakage of the metal powder from the powder supply (130). The first seal (260) may be a mechanical seal. The first seal (260) may be formed by flowing gas through the gap (270) between the powder supply and the dielectric coating (120) of the conductive roller (110). This gas may be used to fluidize the metal powder similar to a fluidized bed as the powder interacts with the conductive roller (110). In an example, the powder supply (130)

includes a vent near the top to allow the gas to escape and/or be recycled. The vent may include a diameter increase to drop the velocity of the gas and prevent metal powder from escaping. The vent may include a filter. The vent may also serve as an opening to refill the powder supply (130). For example, the vent may screw onto a threaded opening in the top and/or side of the powder supply (130).

The second seal (262) may be used with or without the first seal (260). The second seal (262) may comprise a physical block. The second seal (262) may be an air seal. The second seal (262) may be a brush and/or comb to prevent metal powder form leaving in the air but allowing the layer of metal powder on the roller (110) to exit. In an example, the second seal (262) makes light contact with the layer of metal particles on the dielectric coating (120) of the conductive roller (110).

Figure 3:
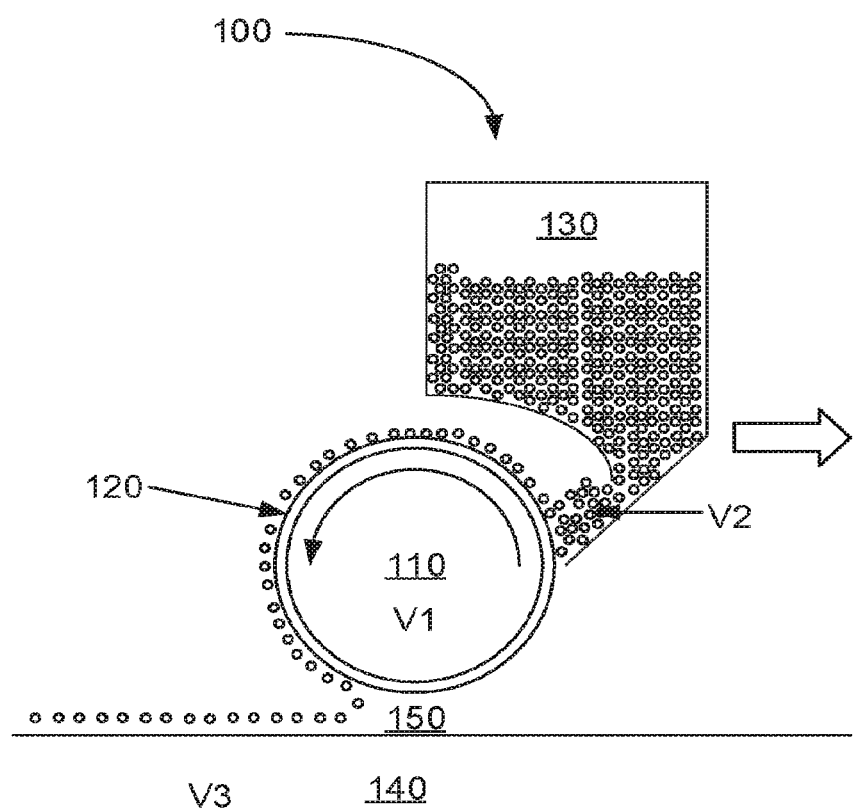
FIG. 3 shows a system to apply uniform layers of metal powder according to one example consistent with the present specification.

FIG. 3 shows a system (100) to apply uniform layers of metal powder according to one example consistent with the present specification. The system (100) includes: a conductive roller (110) with a dielectric coating (120), the conductive roller biased at a first voltage; a powder supply (130) to contain a metal powder biased at a second voltage, the powder supply (130) to provide the metal powder to the conductive roller (110) to form a monolayer of metal powder on the roller (110); a deposition area (140) to receive the monolayer of metal powder from the conductive roller (110), the deposition area (140) biased at a third voltage, wherein the metal powder is transferred across an air gap (150) from the roller (110) to the deposition area (140) by electrostatic attraction of the metal powder, a surface of the deposition area (140) and the surface of the roller (110) are separated by an air gap (150) of 0.1 to 5 mm, and a voltage difference between the first voltage and the third voltage is between 100 and 5000 volts. The system (100) is shown to translate across the deposition area (140) in the direction of the large arrow such that metal powder is deposited onto the deposition area (140).

Figure 4:
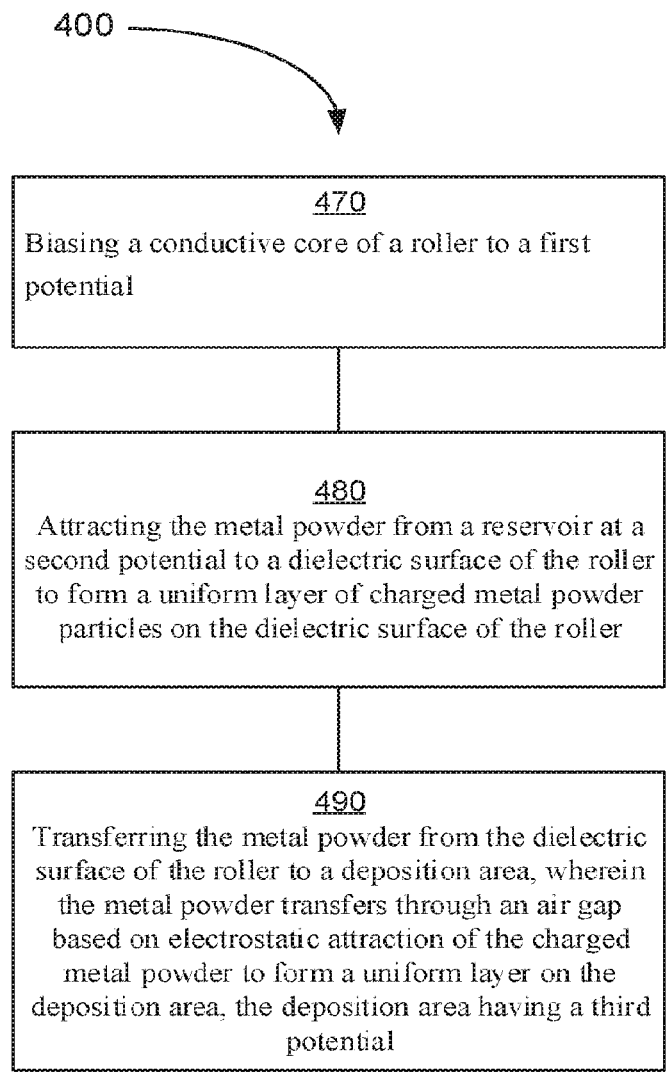
FIG. 4 contains a flowchart for a method of applying uniform layer of metal powder to a substrate consistent with this specification.

FIG. 4 shows a flowchart for a method (400) of applying uniform layer of metal powder to a substrate. The method (400) includes: biasing a conductive core of a roller to a first voltage (470); attracting the metal powder from a reservoir at a second voltage to a dielectric surface of the roller to form a uniform layer of charged metal powder particles on the surface of the roller (480); and transferring the metal powder from the dielectric surface of the roller to a deposition area, wherein the metal powder transfers through an air gap (150) based on electrostatic attraction of the charged metal powder to form a uniform layer on the deposition area, the deposition area having a third voltage (490).

The method (400) is a method of applying uniform layers of metal powder to a substrate. The method includes using electrostatic attraction to move metal powder particles from a reservoir to a roller with a dielectric coating, the charge on the metal powder forming a uniform layer on the roller. The layer of charged metal particles is then transferred to a biased substrate, the biased substrate receiving the layer of metal particles as a uniform layer. This method works to apply metal powders of a variety of sizes but is notable for the ability to apply uniform layers of smaller metal powder particles which may be difficult to apply with spreaders and/or other mechanical approaches.

The method (400) includes biasing a conductive core of a roller to a first voltage (470). The conductive core allows the surface of the roller to be set to a uniform potential. This also avoids the complexity of photoconductor coatings and the associated equipment required to make the photoconductive coating work. Reducing the complexity and number of components is one method to reduce the operating and/or repair costs of a system.

The method (400) includes attracting the metal powder from a reservoir at a second voltage to a dielectric surface of the roller to form a uniform layer of charged metal powder particles on the dielectric surface of the roller (480). The first, second, and/or third voltages may be positive, negative, and/or ground. The specific values of the voltages are flexible compared with the differences in voltage between the first and second voltages and the first and third voltages. Those two differences drive the movement of the metal particles to the roller and to the substrate respectively.

The method (400) includes transferring the metal powder from the dielectric surface of the roller to a deposition area, wherein the metal powder transfers through an air gap based on electrostatic attraction of the charged metal powder to form a uniform layer on the deposition area (140), the deposition area (140) having a third voltage (490). The transfer may be made under electrostatic attraction with or without the aid of gravity. The electrostatic forces are sufficient to hold the particles onto the dielectric surface of the roller. The interaction of charges on the metal particles provides the forces to move them. The ability to rapidly and efficiently form the uniform layer of metal particles to apply is useful in forming three dimensional parts from layers. The described approach provides the ability to control smaller particles, for example, those with a mean largest dimension of 20 microns and/or smaller. Forming the small particles into uniform layers may be readily accomplished by this method. In contrast, forming thin layers of small particles may be challenging with mechanical methods. The describe method is relatively fast and does not use a large number of ejectors and/or other parts to function. Instead the system uses three controlled voltages and a single rotating roller to accomplish the desired goal.

The method (400) may further include patterning the uniform layer of metal powder after the layer has been transferred to the deposition area (140). The method (400) may further include, reducing the difference between the third voltage and the first voltage once the layer has been applied. The layer may be held on the roller until the system (100) is ready for the next layer to be applied. The second voltage may also be modified while holding the layer for application. The second voltage may be kept stable while a layer is being held.

The uniform layer on the surface of the roller may be a monolayer. In an example, the metal powder transferred to the deposition area (140) has a smaller average particle size than a primary build powder in the deposition area (140). In this case primary build powder may be applied in advance by another method and/or tool. The transferred powder could also be a different alloy composition from the primary build powder. Similarly, multiple powder reservoirs (130) containing different metal powders (of different size and/or composition) may be situated near the roller. The bias on the powder multiple powder reservoirs (130) may be used to select which powder reservoir is feeding the conductive roller (110). This flexibility and control may be achieved with a single rotating roller (110) and the system to translate the roller (110) as moving parts. Limiting the moving parts may reduce the capital and/or maintenance costs for the system (100).

Figure 5:
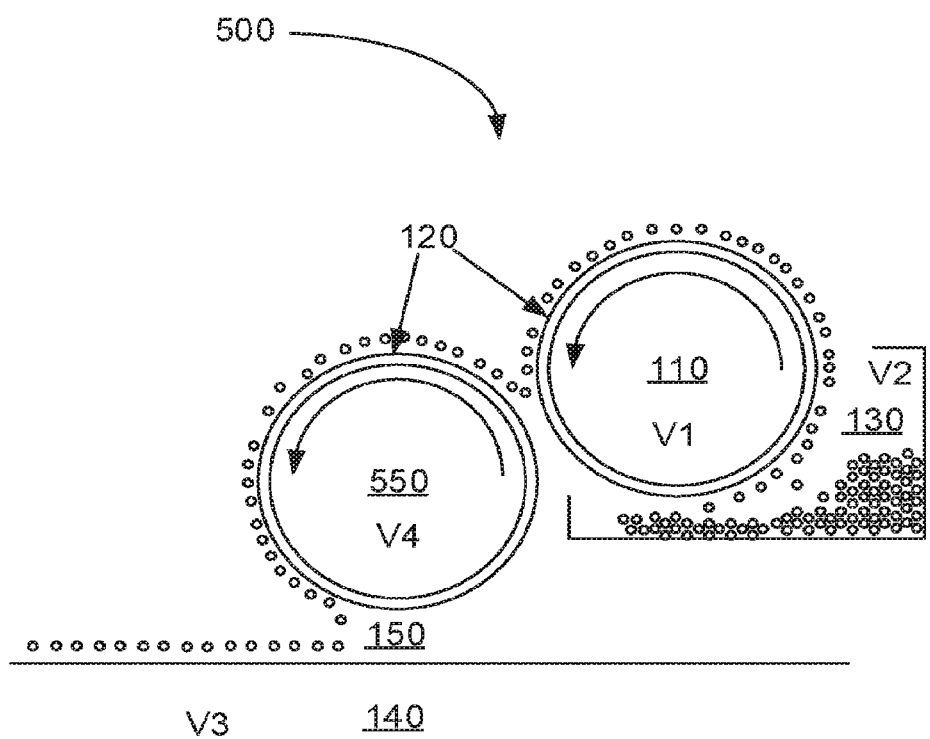
FIG. 5 shows an example of a multiple roller system for applying a uniform layer of metal powder to a substrate according to an example consistent with the present specification.

FIG. 5 shows an example of a multiple roller system (100) for applying a uniform layer of metal powder to a substrate according to an example consistent with the present specification. In this system (100) a second roller (560) is introduced between the conductive roller (110) and application to the deposition area (140). The layer of metal powder is formed on the first roller, which is a conductive roller (110) as described above, and transferred to the second roller (560) and then deposited in the deposition area (140). This allows the system to avoid openings between the powder supply (130) and the first and/or second roller (110, 560) which could allow metal powder to escape due to gravity. Instead, the first roller (110) lifts the metal powder from the powder supply (130) and the second roller (560) carries the layer down to the deposition area (140). The first (110) and second rollers (560) are substantially similar but are biased differently to provide the desired transfer of the layer of metal particles from the first roller (110) to the second roller (560).

It will be appreciated that, within the principles described by this specification, a vast number of variations exist. It should also be appreciated that the examples described are only examples, and are not intended to limit the scope, applicability, or construction of the claims in any way.

What is claimed is:

1. A system to apply uniform layers of metal powder, the system comprising:
   a conductive roller with a dielectric coating, the conductive roller biased at a first voltage;
   a powder supply to contain a metal powder biased at a second voltage, the powder supply to provide the metal powder to the conductive roller to form a uniform layer of metal powder on the dielectric coating of the conductive roller;
   a deposition area to receive the uniform layer of metal powder from the conductive roller, the deposition area biased at a third voltage and including a plurality of layers of particles stacked on each other; and
   a first seal that prevents leakage of the metal powder, the first seal formed by flowing gas through a gap between the powder supply and the dielectric coating of the conductive roller,
   wherein the metal powder is transferred across an air gap from the conductive roller to the deposition area by electrostatic attraction of the metal powder, and further wherein the conductive roller translates relative to the deposition area at various speeds based on a thickness of each layer of the plurality of layers of particles.

2. A system of claim 1, wherein the conductive roller translates relative to the deposition area such that a tangential speed of the roller and the translation speed are equivalent.

3. The system of claim 1, wherein the dielectric coating on the conductive roller comprises a material selected from the group consisting of: aluminum oxide, silicon oxide, zirconium oxide, magnesium oxide, tantalum oxide, titanium oxide, yttrium oxide silicon nitride, aluminum nitride, and mixtures thereof.

4. The system of claim 1, wherein the dielectric coating on the conductive roller has a dielectric thickness between 0.001 and 0.5 mm.

5. The system of claim 1, wherein the electrode and a surface of the deposition area are separated by 0.1 to 3 mm of air gap.

6. The system of claim 1, where a voltage difference between the first voltage and the third voltage is between 100 and 5000 volts.

7. The system of claim 1, wherein the attractive force between a particle adhered to the surface of the roller and the roller is less than the attractive force between the particle and the deposition area.

8. The system of claim 1, wherein the powder has a median particle diameter of less than 10 microns.

9. The system of claim 1, wherein the flowing gas is utilized to fluidize the metal powder as the metal powder interacts with the conductive roller.

10. A system to apply uniform layers of metal powder, the system comprising:
    a conductive roller with a dielectric coating, the conductive roller biased at a first voltage;
    a powder supply to contain a metal powder biased at a second voltage, the powder supply to provide the metal powder to the conductive roller to form a monolayer of metal powder on the roller;
    a deposition area to receive the monolayer of metal powder from the conductive roller, the deposition area biased at a third voltage and including a plurality of layers of particles stacked on each other; and
    a first seal that prevents leakage of the metal powder, the first seal formed by flowing gas through a gap between the powder supply and the dielectric coating of the conductive roller,
    wherein the metal powder is transferred across an air gap from the roller to the deposition area by electrostatic attraction of the metal powder, and further wherein the conductive roller translates relative to the deposition area at various speeds to produce various thicknesses in the plurality of layers of particles stacked on each other.

11. The system of claim 10, wherein the air gap is from 0.2 to 2 mm and the voltage difference is between 500 and 1500 volts.

12. A method of applying uniform layers of metal powder to a substrate comprising:
    biasing a conductive core of a roller to a first voltage;
    attracting the metal powder from a reservoir at a second voltage to a dielectric surface of the roller to form a uniform layer of charged metal powder particles on the dielectric surface of the roller;
    transferring the metal powder from the dielectric surface of the roller to a deposition area, wherein the metal powder transfers through an air gap based on electrostatic attraction of the charged metal powder to form a uniform layer on the deposition area, the deposition area having a third voltage and including a plurality of layers of particles stacked on each other;
    forming a first seal that prevents leakage of the metal powder, the first seal formed by flowing gas through a gap between the powder supply and the dielectric coating of the conductive roller; and
    translating the conductive roller relative to the deposition area at various speeds to produce various thicknesses in the plurality of layers of particles stacked on each other.

13. The method of claim 12, further comprising patterning the uniform layer of metal powder transferred to the deposition area.

14. The method of claim 12, wherein the metal powder transferred to the deposition area has a smaller average particle size than a primary build powder in the deposition area.

15. The method of claim 12, further comprising utilizing a first seal formed by flowing gas through a gap between the reservoir and the dielectric surface of the roller, the gas fluidizing the metal powder as the metal powder interacts with the conductive roller.

* * * * *